Dec. 17, 1968 J. C. FREEBORN 3,417,283
APPARATUS TO PRODUCE PUSH-PULL ELECTRON BEAM DEFLECTION
SIGNALS FROM A SINGLE INPUT SIGNAL
Filed Oct. 17, 1966
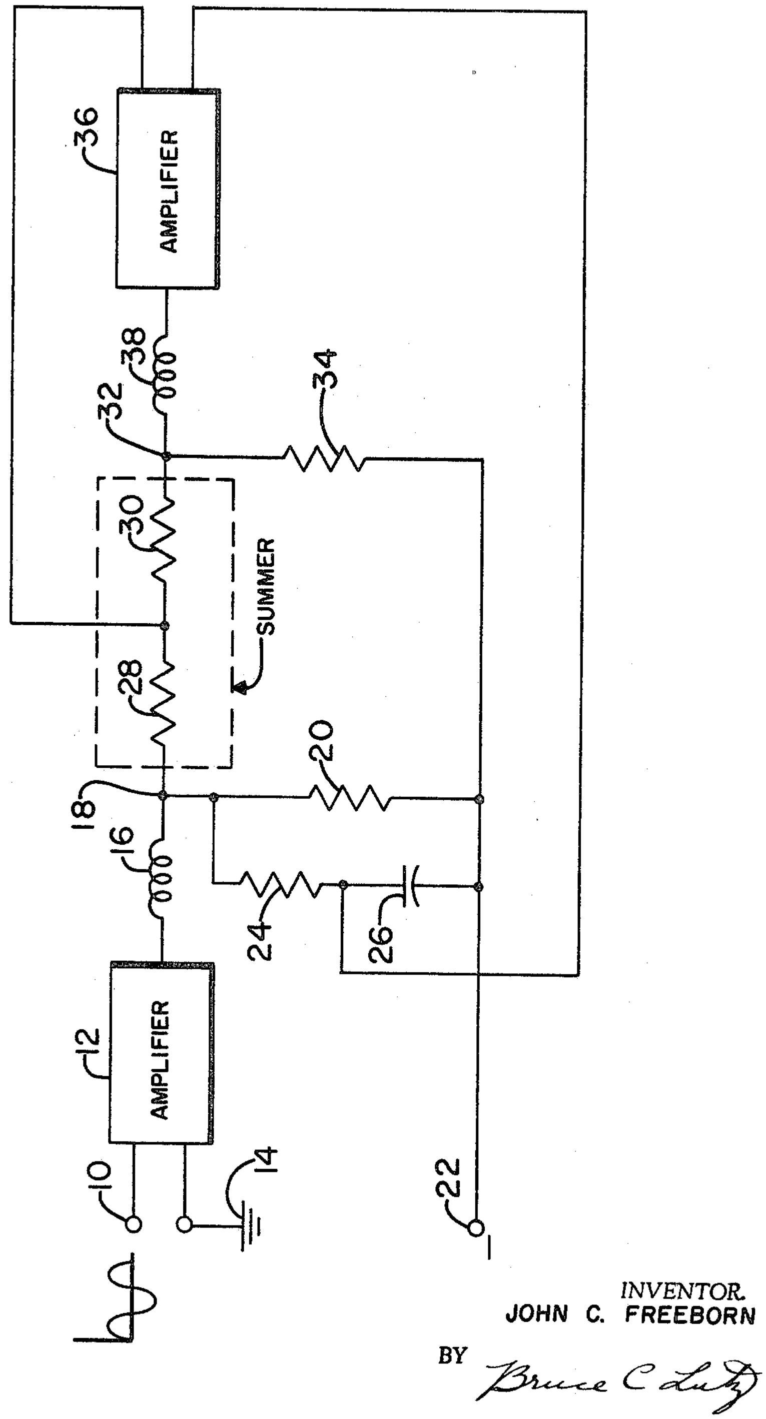
INVENTOR.
JOHN C. FREEBORN
BY Bruce C Lutz
ATTORNEY 3,417,283

APPARATUS TO PRODUCE PUSH-PULL ELECTRON BEAM DEFLECTION SIGNALS FROM A SINGLE INPUT SIGNAL

John C. Freeborn, West Covina, Calif., assignor to Honeywell Inc., Minneapolis, Minn., a corporation of Delaware Filed Oct. 17, 1966, Ser. No. 587,238
9 Claims. (Cl. 315—26)

ABSTRACT OF THE DISCLOSURE

The apparatus of this invention produces substantially equal magnitude and opposite direction currents which are applied to each part of a two part deflection coil of a cathode ray tube deflecting system. A single input signal is applied to one of said parts by an amplifier, whereas, the output of the junction of two series resistors, which are connected between both parts, is applied by a second amplifier as an input to the second part. The D.C. level in both parts is maintained equal by resistor and capacitor connections.

BACKGROUND OF THE INVENTION

This invention was first used to provide a push-pull signal to a magnetically deflected cathode ray oscilloscope from a single input drive signal. A signal which is equal and opposite to the input signal is created by this circuit, and the combination of the input signal and the created signal comprises a push-pull output. The creation of the second signal is accomplished by a feedback technique, therefore the present invention creates an accurate push-pull signal and one in which drift effects tend to be cancelled by the feedback. Thus, the present invention provides a stable, drift-free, symmetrical, push-pull output for deflecting a cathode ray oscilloscope or other purpose, and it does this from a single input signal.

*Description of the invention*

It is an object of this invention to provide a new and novel method of creating a push-pull output signal from a single input signal.

Further objects and advantages will become apparent from a reading of the specification and claims in conjunction with the single figure which shows a preferred embodiment of the present invention driving a cathode ray tube having magnetic deflection.

In the drawing, an input signal is applied to a terminal 10 which is also an input means to an amplifier 12. A second input to amplifier 12 is connected to ground 14. A deflection coil 16 of a magnetically deflected cathode ray tube is connected between an output of amplifier 12 and a junction point 18. A resistive means 20 is connected between junction point 18 and a reference potential or voltage input 22. Reference potential 22 may be ground in some embodiments depending on amplifier designs. The series connection of a resistor 24 and a capacitor 26 is also connected between junction point 18 and reference potential 22. Two resistors 28 and 30 are connected between junction point 18 and a junction point 32 to form a summer or summing circuit. A resistor 34 is connected between junction point 32 and reference potential 22. An amplifier 36 has one input connected to the junction of resistor 24 and capacitor 26 and another input connected to the junction of resistor 28 and resistor 30 which is the output of the summer. Another deflection coil 38 of a magnetically actuated cathode ray tube is connected between an output of amplifier 36 and junction point 32.

*Operation of the invention*

If an AC input signal is applied to terminal 10 this will cause a current to flow in deflection coil 16, and into the electronic summer which is formed by resistors 28 and 30. Resistors 20 and 34 are equal in the present embodiment and of a much lower value than resistors 28 and 30, in order that resistors 20 and 34 provide a low driving impedance to the electronic summer formed by resistors 28 and 30. Assume now that the only signal present in the circuit occurs at junction point 18. Then, a signal will be created at the junction of resistors 28 and 30 which will provide an input to amplifier 36. This input to amplifier 36 will cause a current to flow through deflection coil 38. This current flowing in deflection coil 38 will cause a signal to appear at junction point 32. When the signals at junction points 18 and 32 are equal and opposite, there is no signal input to amplifier 36 from the junction of resistors 28 and 30. At this time the currents flowing in deflection coil 16 and deflection coil 38 are equal and opposite. This means that a push-pull deflection signal has been created from a single input signal occurring at terminal 10.

This signal created is only with respect to the AC signal present at input terminal 10, however. If a match of the total signal is desired, the remainder of the circuitry must be used. The resistor 24, capacitor 26 form a filter which extracts the DC component of the signal appearing at junction point 18 with respect to ground 14 and provides a second input to amplifier 36. This second input to amplifier 36 is proportional to the DC component of this signal at junction point 18. Thus the feedback loop formed causes a current in deflection coil 38 which has a DC component equal to that in deflection coil 16 by virtue of the DC feedback from the junction of resistor 24 and capacitor 26 and has an AC component equal and opposite to that in deflection coil 16 by virtue of the feedback from the junction of resistor 28 and 30.

It will be obvious to those skilled in the art that other types of amplifiers may be used in place of the amplifiers pictured.

It will also be obvious to those skilled in the art that a voltage deflected cathode ray tube rather than the previously described current deflected cathode ray tube may also be driven by the same technique by using the voltage created at junction points 18 and 32 as push-pull deflection voltages to drive the cathode ray tube.

It is also obvious to those skilled in the art that this type of circuit is not limited to driving cathode ray tubes. The invention shown will provide a push-pull output for any purpose in response to a single input signal.

Power supplies which are not shown may be necessary to provide power to some of the blocks.

Other alterations and variations will be obvious to those skilled in the art. I do not wish to be limited to the specification or to the particular embodiment shown in the figure but only by the following claims in which I intend to cover all modifications which do not depart from the spirit and scope of this invention.

I claim:

1. Electronic apparatus for creating a push-pull output signal from a single input signal for application to a push-pull load, comprising:

(a) a signal summer including first input means, second input means, and output means;

(b) push-pull load means including first and second portions;

(c) means, for receiving an input signal and connected to said first portion of said load means for applying therethrough a representation of that signal to said first input means of said summer;

(d) means for creating a signal which is substantially equal and opposite to the signal applied to said first input means of said summer;

(e) means connecting the creating means through the second portion of said load means to said second input means of said summer; and (f) means connecting said output means of said summer to the creating means, the signal appearing at said output means of said summer controlling the creating means to insure that a signal equal and opposite to that appearing at said first input means of said summer is created by the creating means.

2. The apparatus of claim 1 further comprising means sensing the DC level of the input signal and causing the creating means to produce an equal DC level so that DC component of the input signal is matched.

3. The apparatus of claim 2 wherein:

the means for receiving include an amplifier connected to receive the input signal and provide a signal to said load means; and the means for creating includes an amplifier connected to provide an output signal to said load means and connected to receive an input signal from said output means of said summer.

4. The apparatus of claim 2, wherein the sensing means comprises a filter which extracts the DC component from the input signal.

5. The apparatus of claim 1 wherein:

the receiving means comprises an amplifier connected to receive the input signal and provide a signal through said load means to said first input means of said summer; and the creating means comprises an amplifier connected to provide an output signal through said load means to said second input means of said summer and to receive an input signal from said output means of said summer.

6. Electronic apparatus for use in deflecting an electron beam in a cathode ray tube, comprising:

(a) a signal summer, including first input means, second input means, and output means;

(b) means for receiving an input signal;

(c) means for creating a signal which is substantially equal and opposite to any signal applied to said first input means of said summer;

(d) deflection means connecting the receiving means to said first input means of said summer and connecting the creating means to said second input means of said summer for providing deflection to a stream of electrons whereby a cathode ray tube is driven by the signals at said first input means and said second input means of said summer;

(e) means connecting said output means of said summer to the creating means the signal appearing at said output means of said summer controlling the creating means to insure that a signal is equal and opposite to that appearing at said first input means of said summer is created by the creating means.

7. The apparatus of claim 6 wherein:

the receiving means comprises an amplifier connected to receive the input signal and provide a signal for the deflection means; and the creating means comprises an amplifier for providing a signal for the deflection means and for receiving a signal from said output means of said summer.

8. The apparatus of claim 6 further comprising means sensing the DC level of the input signal and causing the creating means to produce an equal DC level so that the DC component of the input signal is matched.

9. The apparatus of claim 8 wherein the sensing means comprises a filter which extracts the DC component from the input signal.

References Cited

UNITED STATES PATENTS

| | | | |
|---|---|---|---|
| 2,566,432 | 9/1951 | Sziklai | 315—27 |
| 2,844,759 | 7/1958 | Bryan | 315—26 X |
| 2,909,620 | 10/1959 | Graef | 330—151 X |

RODNEY D. BENNETT, *Primary Examiner.*

M. F. HUBLER, *Assistant Examiner.*

U.S. Cl. X.R.

315—27; 330—9